United States Patent Office 2,942,979
Patented June 28, 1960

2,942,979

MALT BEVERAGES

Edward Segel and Edwin J. Wye, Chicago, Ill., assignors to J. E. Siebel Sons' Company, Inc., Chicago, Ill., a corporation of Illinois No Drawing. Filed Feb. 20, 1959, Ser. No. 794,510

7 Claims. (Cl. 99—48)

This invention relates to the improvement of carbonated alcoholic beverages derived from malt.

More specifically, it relates to the improvement of foam and of shelf life in beverages such as beer, ale, and so-called "near beer." In the present specification, the word "beer" is used to include the entire class of carbonated malt beverages.

When a carbonated alcoholic malt beverage, such as beer, is poured into a glass from a previously closed container of conventional type, a head of foam forms which gradually subsides. This head of foam has aesthetic appeal to the consumer. It is highly desirable that the foam be long-lived and attractive in appearance.

The quality of beer foam and the rate at which it collapses depend both on the beer itself and on how it is poured. If different beers are poured under exactly the same condition, it will in general be found that their foams collapse at different rates.

The reason why the foams of different beers collapse at different rates is not completely understood. The size of the gas bubble is recognized as an important factor in foam life, as discussed by de Clerck and de Dycker in Proceedings of the European Brewery Convention, Copenhagen, pp. 43-50 (1957). A material which can be added to beer to reduce bubble size is desirable, both to increase foam life and to make a more "creamy" appearing foam.

Variation in foam life is found not only among different brands of beer, but in different batches of beer made by the same brewery. One of the aims of a brewery is to produce consistently a beer which gives a long lasting head of foam. This goal is not easy to attain.

Detergents have a harmful effect on beer foam, shortening foam life substantially. Since traces of detergents may be introduced inadvertently into beer, either as a residue from cleaning procedures in the brewery, or by incomplete rinsing of glasses used by the consumer, a material which would inhibit this harmful effect of detergents is highly desirable.

Another important requirement of beer is that it have a relatively long shelf life. By shelf life is meant the length of time beer can be stored and still retain its clarity. Another way of stating this properly is that beer should be resistant to oxidation haze, since it is commonly believed that the undesirable development of haze in beer stored for more or less lengthy periods of time is due to interaction of beer with oxygen present in the finished beer container.

A method of treating beer so as to increase its shelf life would be a great aid to the brewing industry.

An object of this invention is to decrease bubble size and increase foam life in any carbonated malt beverage.

Another object of this invention is to produce a beer more pleasing to the consumer, in that the head of foam formed when the beer is poured into a glass is creamier, more attractive in appearance, and collapses more slowly.

Still another object is to produce a beer whose foam life is resistant to the deleterious effect of detergents.

A further object of this invention is to provide a beer with increased shelf life.

Other objects of this invention will appear hereinafter.

We have discovered that high molecular weight polymers of ethylene oxide have a remarkable effect on beer foam. By "high molecular weight polymers of ethylene oxide" or more simply "polyethylene oxide" we mean polymers of ethylene oxide in the approximate molecular weight range of about two hundred thousand to about five million. These have a viscosity in the range from about 200 centipoises at 5% by weight concentration in water at 25° C. to about 5000 centipoises at 1% concentration, as measured by Brookfield viscometer RVF at 2 r.p.m. and largest spindle for desired scale.

The addition of the polyethylene oxide to beer markedly lowers the bubble size, increases creaminess, and increases the time which elapses between pouring the beverage into a glass and the disappearance of the foam so formed.

To determine the foam life of beer, the time required for collapse of the head of foam on a glass of beer is measured under standardized conditions. Reproducible results are obtainable by control over the distance through which the beer falls when poured, the time required for pouring a standard volume, and the temperature of the beer when poured.

The effect of the polyethylene oxide is strikingly consistent, considering the great difference among beers on the market. The degree of increase in foam life will in part depend on the polymer grade and its concentration, as well as to some extent on the particular beer used.

A further advantage of polyethylene oxide is that it inhibits the deleterious effect of common detergents on beer foam. Thus, while the foam of untreated beer is made markedly worse by such detergents as, for example, cetyl trimethyl ammonium bromide, or polyoxyethylene sorbitan monooleate ("Tween 80", manufactured by Atlas Powder Co.), a beer containing polyethylene oxide is not so affected.

The high molecular weight polyethylene oxide suitable for use in this invention may be made by polymerization of ethylene oxide, as for example by heating in the presence of alkaline earth carbonate catalysts, as described in Industrial and Engineering Chemistry, vol. 50, pp. 5-7, 1958.

This polymer is water soluble and in the amounts employed herein is nontoxic. It may be introduced either as an aqueous solution, or the solid may be dissolved directly in the beverage during manufacture.

For best results, the desired concentration of high molecular weight ethylene oxide polymer must often be at least 80-160 parts per million.

We have further found that a combination of the polyethylene oxide and water soluble cobaltous salts has an unexpected beneficial effect on beer foam, unobtainable except by such combination.

We have discovered that the use of very small amounts of such cobalt salts along with the polyethylene oxide improves foam consistently, even with beers already having good foam. The improvement is much more marked than the use of either the cobalt or the polyethylene oxide alone and greater than what one might expect to be their additive result. The use of minor amounts of the cobalt salts permits the use of much lower amounts of the polyethylene oxide, thus also effecting an economic saving.

It is known that cobalt salts by themselves sometimes improve the foam life of beers. Such improvement, however, is small, is not consistent, is variable from one beer to another, and is significant only with beers of poor foam stability. The effect of cobalt salts in consistently enhancing the effect of polyethylene oxide on foam is therefore surprising, and could not be anticipated.

It is found that with some beers rather high levels of polyethylene oxide, as for example 160 parts per million, are necessary to effect marked improvement in beer foam. By the addition of relatively small amounts of the cobaltous salts, such as in the range of from about 0.5 to about 5 parts per million, calculated as cobalt, good improvement can be noted in these same beers even at levels as low as from about 20 to about 40 parts per million of the polyethylene oxide, in accordance with the present invention.

For most purposes, the desired concentration of the high molecular weight ethylene oxide polymer when combined with the cobalt lies in the range of from about 40 to about 80 parts per million, and in such cases the preferred amounts of the cobaltous salt are from about 1 to about 2 parts per million calculated as cobalt. For some beers higher concentrations, such as up to about 160 p.p.m. of the polyethylene oxide, may be desirable even in combination with the cobaltous salts, and these can readily be determined by simple experiment, to obtain the desired or required foam enhancement and storage clarity.

It is especially surprising that the effects of a combination of cobalt salts and polyethylene oxide on foam are noticeable in those very beers in which cobalt salts alone or polyethylene oxide alone produces comparatively little or no effect.

The mechanism or cause of this unexpected augmentation of the effect of the polyethylene oxide by the cobaltous salts is unknown, but lack of knowledge of the cause does not prevent using the effect to advantage.

It is sufficient to know that combinations of polyethylene oxide and water soluble cobaltous salts greatly improve the foam of beer, so that one may with certainty obtain a beer with outstanding foam, unobtainable from either untreated beer, or by the addition merely of polyethylene oxide or cobaltous salts alone, even in substantially greater amounts.

An important and completely unexpected further advantage of beers treated with a combination of cobaltous salts and polyethylene oxide is the enhanced stability of such beers to oxidation, so that the rate of formation of oxidation haze is decreased. The shelf life of such treated beers is therefore longer than similar untreated beers.

The effect of treatment with the cobalt-polyethylene oxide mixtures on shelf life can be strikingly demonstarted by placing samples of beers so treated side by side with identical untreated beers on a mechanical agitator, and agitating them at room temperature for 48 hours. Such a procedure produces the same deteriorative character into beer as does normal room temperature storage for several months. Retention of clarity of beer under such treatment is indicative of stability and excellent shelf life, whereas formation of hazes during shaking is undesirable, showing poor storage characteristics of the beer.

The results of such prolonged agitation on beer can be evaluated simply by examining tested bottles of beer through a bright light; differences in clarity are evident visually. Qualitative designations of clarity vary from brilliant through clear, slightly veiled, moderately veiled, veiled, and finally turbid.

A more precise, quantitative estimation of beer clarity can be used to determine the effect of deteriorative oxidation on beer. Samples of beer after the agitative treatment described are examined in an optical instrument known as a photo-nephelometer. This instrument is designed to measure the light reflected from the disperse phase of a suspension—in this case the tiny particles of solid thrown out of the beer solution by agitation. The intensity of the reflected light—the Tyndall light—is directly related to the concentration of the disperse particles. The photo-nephelometer accurately measures even extremely low concentrations of suspended solids.

The measure of clarity obtained by examination of beer samples in a photo-nephelometer are expressed in terms of Nephelos values. Nephelos values are numbers on an arbitrary linear scale. Certified permanent Nephelos standards are used to provide a means of expressing the appearance of haze in terms of a linear, numerical system which is reproducible and rational. The higher the Nephelos value, the greater the haze.

A more detailed explanation of Nephelos values may be found in a manual, "Operating Directions for the Coleman Model 7 Photo-nephelometer," published by Coleman Instruments, Inc., 318 Madison Street, Maywood, Illinois. It suffices here to say that haze formation in beer is undesirable, that haze formation can be seen by examination of the beer through a strong light, and that these visual observations of differences in beer clarity can be given a quantitative expression by determination of Nephelos values in a photonephelometer.

Many samples of a large number of different beers treated with a mixture of cobalt and polyethylene oxide as described in this invention were compared with identical untreated beers, after the shelf life test described herein. In every case hazes were observed visually, and Nephelos values were determined. Consistently, beers treated with cobalt-polyethylene oxide had substantially less haze and markedly lower Nephelos values than similar untreated beers.

For the purposes of this invention, any water soluble cobaltous salt which furnishes cobaltous ions in solution is satisfactory, these being also nontoxic in the useful proportions given. Examples of such salts are cobaltous chloride, cobaltous citrate, cobaltous sulfate, cobaltous nitrate, and cobaltous acetate, or their mixtures (commonly cobaltous is written simply as cobalt). For convenience, we shall speak of the addition of cobalt or cobalt salts to beer. It is undestood that this means cobaltous ion added in the form of a cobaltous salt. Concentrations of cobalt given herein refer to concentrations of cobaltous ion rather than of the cobalt salt.

The cobalt salt may be added either as a solid or as an aqueous solution, either incorporated with polyethylene oxide, or the two materials—cobalt salt and polyethylene oxide—may be added separately. Whether these two ingredients are added separately or together does not influence the effect on beer, provided both materials are present in the finished beer.

While the cobalt and polyethylene oxide may be added during or even before fermentation, we prefer to add them after the completion of fermentation, to avoid possible loss of material by absorption or adsorption by yeast or other solid material.

Although the aforesaid cobaltous salt and polyethylene oxide components can be added separately as solids or in aqueous solution, they can be previously combined, in optimum proportions, and packaged as a vendable composition, in the form of a solid mixture or aqueous solution. Thus, for example, the composition can be composed of from about 0.3 to about 25 percent by weight calculated as cobalt of water-soluble cobaltous salt and the balance high molecular weight polyethylene oxide, exclusive of aqueous solvent when employed. Preferably such mixture is composed of from about 1.25 to about 5% by weight calculated as cobalt of the former to from about 98.75 to about 95% of the latter, corresponding to the relative proportions useful when adding 1–2 p.p.m. calculated as cobalt of the cobaltous salt and 40–80 p.p.m. of high molecular weight polyethylene oxide in the preferred range hereinbefore set forth.

The use of a combination of cobalt and polyethylene oxide as described herein has no adverse effect on the taste, stability, or brilliance of beer so treated, and is unobjectionable from the standpoint of health.

The following examples illustrate the use of a combination of cobaltous salt and high molecular weight polymers of ethylene oxide in beer, but are in no way intended to limit the scope of our invention.

*Example I*

A 1.34% aqueous solution of a high molecular weight polyethylene oxide (viscosity of 1% solution about 3000 centipoises, Brookfield RVF viscometer, 2 r.p.m.) was added to finished beer A. At approximately the same time an 0.134% aqueous solution of cobaltous chloride hexahydrate was added. The final concentration of the polymer was 40 p.p.m., and the final concentration of cobalt was 2 p.p.m. This beer had a foam collapse time of 7 minutes and 10 seconds. The same beer under identical conditions but without the addition of either polyethylene oxide or cobalt chloride had a collapse time of 5 minutes 18 seconds. The same beer under identical conditions with the addition of 40 p.p.m. polyethylene oxide but without cobalt had a collapse time of 5 minutes 38 seconds, while with 2 p.p.m. cobalt but no polyethylene oxide the collapse time was 5 minutes 52 seconds.

*Example II*

A 1.34% aqueous solution of a high molecular weight polyethylene oxide (viscosity of a 1% solution about 20 centipoises) was added to finished beer B. At the same time an 0.134% aqueous solution of cobaltous chloride hexahydrate was added. The final concentration of the polymer was 20 p.p.m., and the final concentration of cobalt was 5 p.p.m. This beer had a foam collapse time of 6 minutes 46 seconds. The same beer under identical conditions but without the addition of either polyethylene oxide or cobalt chloride had a collapse time of 5 minutes 48 seconds. The same beer under identical conditions with the addition of 20 p.p.m. polyethylene oxide had a collapse time of 5 minutes 46 seconds, while with 5 p.p.m. cobalt the collapse time was 5 minutes 42 seconds.

*Example III*

A 1.34% aqueous solution of a high molecular weight polyethylene oxide (viscosity of a 1% solution about 20 centipoises) was added to finished beer C. At the same time an 0.134% aqueous solution of cobaltous chloride hexahydrate was added. The final concentration of the polymer was 40 p.p.m., and the final concentration of cobalt was 0.5 p.p.m. This beer had a foam collapse time of 6 minutes 26 seconds. The same beer under identical conditions but without the addition of either polyethylene oxide or cobalt chloride had a collapse time of 5 minutes 18 seconds. The same beer under identical conditions with the addition of 40 p.p.m. polyethylene oxide had a collapse time of 5 minutes 31 seconds, while with 0.5 p.p.m. cobalt the collapse time was 5 minutes 10 seconds.

*Example IV*

A 1.34% aqueous solution of a high molecular weight polyethylene oxide (viscosity of a 1% solution about 200 centipoises) was added to finished beer D. At the same time an 0.134% aqueous solution of cobaltous chloride hexahydrate was added. The final concentration of cobalt was 2 p.p.m.

Bottles of beer so treated were mechanically agitated for two days, side by side with similar untreated bottles.

At the end of the 2-day period, the treated beer was clear, and had a Nephelos value of 48, while the untreated beer was moderately veiled and had a Nephelos value of 107.

*Example V*

A 1.34% aqueous solution of a high molecular weight polyethylene oxide (viscosity of a 1% solution about 20 centipoises) was added to finished beer E. At the same time an 0.134% aqueous solution of cobaltous chloride hexahydrate was added. The final concentration of the polymer was 40 p.p.m., and the final concentration of cobalt was 5 p.p.m.

Bottles of beer so treated were mechanically agitated for two days, side by side with similar untreated bottles.

At the end of the 2-day period, the treated beer was clear and had a Nephelos value of 52, while the untreated beer was moderately veiled and had a Nephelos value of 115.

*Example VI*

2.37 pounds of a composition of matter composed by weight of 15.6% cobalt nitrate hexahydrate and 84.4% polyethylene oxide was added to 100 barrels of beer F. The final concentration of the polymer was about 80 p.p.m. and the final concentartion of the cobalt nitrate calculated as cobalt was about 3 p.p.m. This beer had a foam collapse time of 6 minutes 59 seconds. The same beer under identical conditions but without the addition of either the polyethylene oxide or the cobalt nitrate had a collapse time of 5 minutes 17 seconds. The same beer under identical conditions with the addition of 80 p.p.m. polyethylene oxide had a collapse time of 5 minutes 55 seconds, while with 3 p.p.m. cobalt the collapse time was 5 minutes 27 seconds.

Bottles of the above beer treated with a combination of cobalt and polyethylene oxide were mechanically agitated for two days, side by side with similar untreated bottles. At the end of the 2-day period, the treated beer appeared brilliant and had a Nephelos value of 15, while the untreated beer appeared clear and had a Nephelos value of 32.

We claim:

1. The method of prolonging the foam life and clarity on storage of fermented malt beverage which comprises dissolving therein stabilizing non-toxic amounts of high molecular weight polyethylene oxide and cobaltous salt.

2. The method of prolonging the foam life and clarity on storage of fermented malt beverage which comprises dissolving therein from about 20 to about 160 parts per million of high molecular weight polyethylene oxide and from about 0.5 to about 5 parts per million calculated as cobalt of water soluble cobaltous salt.

3. The method of prolonging the foam life and clarity on storage of fermented malt beverage which comprises dissolving therein from about 40 to about 80 parts per million of high molecular weight polyethylene oxide and from about 1 to about 2 parts per million calculated as cobalt of water soluble cobaltous salt.

4. A normally foam producing fermented malt beverage containing a foam prolonging and storage clarity stabilizing additive composition of high molecular weight polyethylene oxide and cobaltous salt dissolved therein.

5. A normally foam producing fermented malt beverage including in solution from about 40 to about 80 parts per million of high molecular weight polyethylene oxide and from about 1 to about 2 parts per million calculated as cobalt of water soluble cobaltous salt.

6. A foam prolonging and storage clarity stabilizing composition composed of high molecular weight polyethylene oxide and water-soluble cobaltous salt in the proportion of from about 0.3 to about 25% by weight calculated as cobalt of the former and the balance the latter, as its essential active components.

7. A foam prolonging and storage clarity stabilizing composition composed of high molecular weight polyethylene oxide and water-soluble cobaltous salt in the proportion of from about 1.25 to about 5% by weight calculated as cobalt of the former and the balance the latter, as its essential active components.

References Cited in the file of this patent

UNITED STATES PATENTS 2,865,755     Thorne _____ Dec. 23, 1958